US007757662B2

(12) United States Patent
Cooke

(10) Patent No.: US 7,757,662 B2
(45) Date of Patent: Jul. 20, 2010

(54) FUEL INJECTION METERING VALVES

(75) Inventor: Michael Peter Cooke, Gillingham (GB)

(73) Assignee: Delphi Technologies, Inc., Troy, MI (US)

(*) Notice: Subject to any disclaimer, the term of this patent is extended or adjusted under 35 U.S.C. 154(b) by 134 days.

(21) Appl. No.: 12/283,044

(22) Filed: Sep. 9, 2008

(65) Prior Publication Data

US 2009/0114193 A1 May 7, 2009

(30) Foreign Application Priority Data

Nov. 5, 2007 (EP) ................................. 07254369

(51) Int. Cl.
*F02M 63/00* (2006.01)
*G05D 11/00* (2006.01)

(52) U.S. Cl. .................................... 123/447; 137/87.01

(58) Field of Classification Search ................. 123/446, 123/447, 456; 137/87.01, 98, 99, 99.5, 100
See application file for complete search history.

(56) References Cited

U.S. PATENT DOCUMENTS 4,043,198 A * 8/1977 Stillwell et al. ............... 73/242
4,280,464 A * 7/1981 Kanai et al. ................. 123/447
4,509,548 A * 4/1985 Grasso ........................ 137/99
4,752,211 A * 6/1988 Sabin .......................... 431/90
4,971,016 A * 11/1990 Peters et al. ................ 123/500
5,024,195 A 6/1991 Pien
5,277,162 A * 1/1994 Smith et al. ................. 123/446
5,423,301 A * 6/1995 Bissett et al. ............... 123/446
5,642,714 A * 7/1997 Buckley ..................... 123/447
5,701,869 A * 12/1997 Richardson et al. ......... 123/497
5,960,809 A * 10/1999 Keller ......................... 137/12
6,378,498 B2 * 4/2002 Kohketsu et al. ............ 123/447
6,497,244 B2 * 12/2002 Needham ..................... 137/98
6,601,565 B2 * 8/2003 Tofan-Petre ................. 123/457
6,742,503 B2 * 6/2004 Feucht ....................... 123/446
6,899,085 B2 * 5/2005 Kelly ......................... 123/447
7,131,427 B2 * 11/2006 Kawasaki et al. ........... 123/456
2006/0180124 A1 8/2006 Heine et al.
2009/0314262 A1 * 12/2009 Sellentin ..................... 123/557

FOREIGN PATENT DOCUMENTS

AU 18 914 67 9/1968

OTHER PUBLICATIONS

EP Search Report dated Apr. 7, 2008.

* cited by examiner

*Primary Examiner*—Thomas N Moulis
(74) *Attorney, Agent, or Firm*—Thomas N. Twomey

(57) ABSTRACT

A fuel injection metering valve has a first fuel outlet for supplying fuel to a first accumulator volume, a second fuel outlet for supplying fuel to a second accumulator volume, valving for controlling fuel flow to the first and second fuel outlets, a first flow path for exposing the valving to fuel pressure representative of fuel pressure in the first accumulator volume and a second flow path for exposing the valving to fuel pressure representative of fuel pressure in the second accumulator volume. The valving is responsive to the representative fuel pressures to control the fuel supply from the second fuel outlet to the second accumulator volume as a function of the fuel pressure in the first accumulator volume. The fuel injection metering valve can be used in a dual-fuel fuel injection system to control the flow of one fuel such that it follows the controlled pressure of a different fuel, so that it is not necessary to provide duplication control components in the fuel injection system.

24 Claims, 5 Drawing Sheets

FUEL INJECTION METERING VALVES

FIELD OF THE INVENTION

The invention relates to fuel injection metering valves and particularly, but not exclusively, to fuel injection metering valves for use in dual-fuel fuel injection systems.

BACKGROUND OF THE INVENTION

Much research on advanced modes of combustion such as Homogeneous Charge Compression Ignition (HCCI) has indicated that it is very difficult to find a fuel that is capable of using such modes over the full load and speed range of an engine. At low loads and speeds, diesel fuel is suitable because of its low auto ignition temperature. However, at high loads and speeds where the cylinder temperature will be higher, diesel fuel can ignite too far before top dead centre and burn too quickly. This results in low efficiency, excessive cylinder pressures and high engine noise. Petrol or ethanol is a more suitable fuel for such conditions because of its higher auto ignition temperature. However, a higher auto ignition temperature means that it is difficult to obtain compression ignition with these fuels at low engine speeds and loads.

A solution to this problem would be to have a fuel injection system able to change between different fuels for different operating conditions. With the currently known technology this would entail having two separate injection systems with dedicated injector sets, inlet metering valves, pressure regulators and fuel pumps. This would be very expensive for automotive use and may give rise to space and/or weight problems.

SUMMARY OF THE INVENTION

In a first aspect, the invention provides a fuel injection metering valve having a first fuel outlet for supplying fuel to a first accumulator volume, a second fuel outlet for supplying fuel to a second accumulator volume, valving for controlling fuel flow to said first and second fuel outlets, a first flow path for exposing said valving to a fuel pressure representative of fuel pressure in said first accumulator volume and a second flow path for exposing said valving to fuel pressure representative of fuel pressure in said second accumulator volume; said valving being responsive to said representative fuel pressures to control the fuel supply (or fuel flow rate) from said second fuel outlet to said second accumulator volume as a function of the fuel pressure in said first accumulator volume.

Suitably, the fuel injection metering valve is arranged in such a way that: to reduce the pressure in one of said first or second accumulator volumes, the metering valve acts to decrease the fuel supply from said first or second fuel outlets, respectively (for example, by restricting the fuel flow rate through the valve to the first or second fuel outlet); and to increase the pressure in one of said first or second accumulator volumes, the metering valve acts to increase the fuel supply from said first or second fuel outlets, respectively (for example, by increasing the fuel flow rate through the valve to the first or second fuel outlet).

In a second aspect, the invention also includes a fuel pump having an integral fuel injection metering valve as described herein, said pump comprising pumping apparatus for separately pumping and outputting respective fuel flows received from said first and second fuel outlets.

In a third aspect, the invention further includes a fuel injection system comprising a fuel injection metering valve configured, in use, to supply a first fuel output and a second fuel output to a first accumulator volume and a second accumulator volume, respectively; and having valving in flow communication with respective flow paths that, in use, expose respective pressure receiving portions of the valving to respective fuel pressure flows indicative of the fuel pressures in said first and second accumulator volumes; said valving being responsive to said pressure flows to cause the fuel pressure in said second accumulator volume to follow the fuel pressure in the first accumulator volume.

Suitably, the fuel injection metering valve within the fuel injection system of the invention is as described in relation to the first aspect of the invention.

In a fourth aspect, the invention provides a fuel delivery system comprising a fuel injection system of the invention.

In a fifth aspect, the invention provides a method of controlling fuel pressure in a fuel injection system, said method comprising pumping a first fuel from a fuel reservoir into a first accumulator volume, pumping a second fuel from a second fuel reservoir into a second accumulator volume, setting a delivery pressure for said first fuel from said first accumulator volume, exposing a valve member to a source of said first fuel that is at a pressure indicative of said delivery pressure and exposing said valve member to a source of said second fuel at a pressure indicative of a delivery pressure of said second fuel; said valve member being operable to respond to the respective pressures indicative of delivery pressure to cause the delivery pressure of said second fuel to be substantially maintained in fixed relation to the delivery pressure of said first fuel.

As the person skilled in the art will readily appreciate, the first and second accumulator volumes in each of the aspects and embodiments of the invention may suitably be first and second common rails.

These and other aspects, objects and the benefits of this invention will become clear and apparent on studying the details of this invention and the appended claims.

All references cited herein are incorporated by reference in their entirety. Unless otherwise defined, all technical and scientific terms used herein have the same meaning as commonly understood by one of ordinary skill in the art to which this invention belongs.

BRIEF DESCRIPTION OF THE DRAWINGS

In order that the invention may be well understood, some embodiments thereof, which are given by way of example only, will now be described with reference to the drawings in which.

DETAILED DESCRIPTION OF THE ILLUSTRATED EMBODIMENTS

Figure 1:
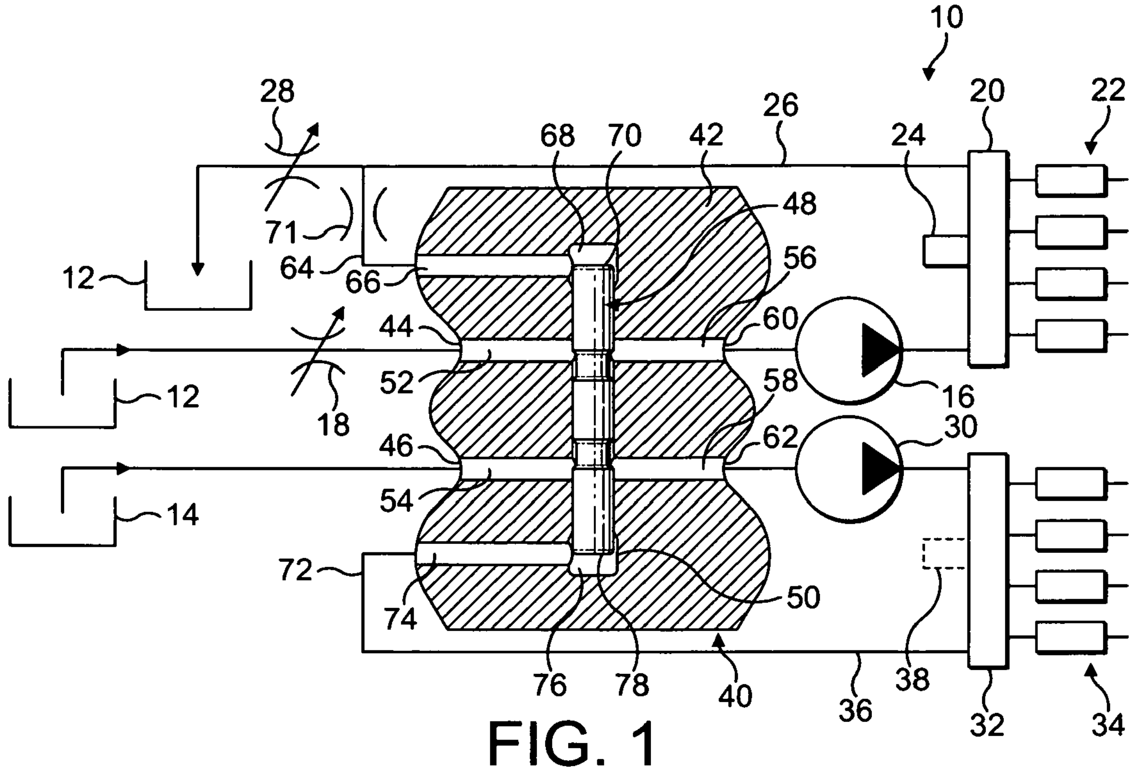
FIG. 1 is a schematic representation of a dual-fuel fuel injection system showing a fuel injection metering valve of the system in cross section.
Figure 2:
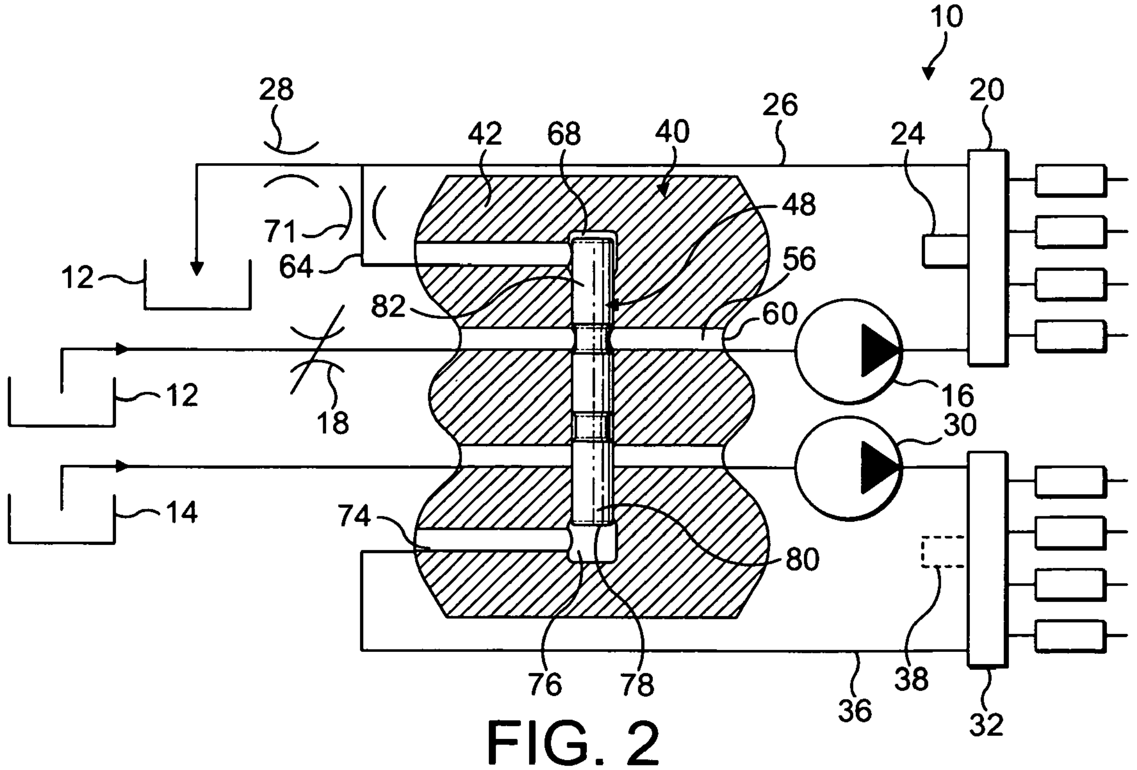
FIG. 2 shows the dual-fuel fuel injection system of FIG. 1 with the fuel injection metering valve in a first different operating condition.
Figure 3:
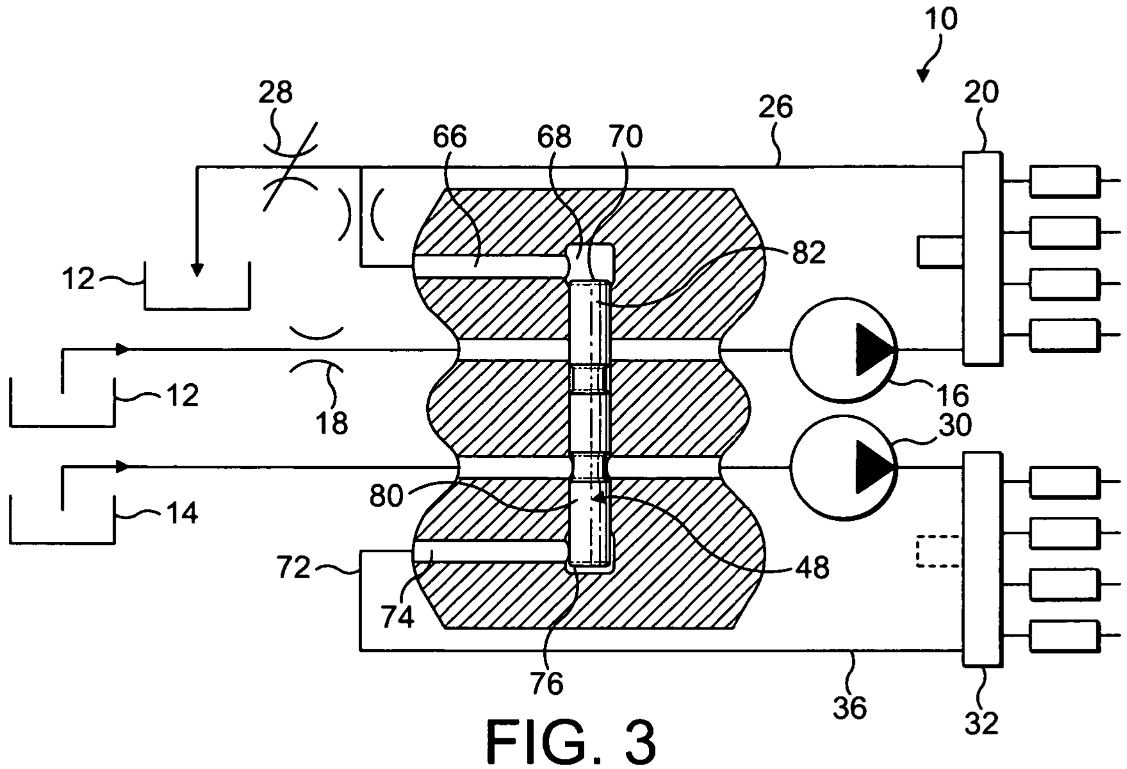
FIG. 3 shows the dual-fuel fuel injection system of FIG. 1 with the fuel injection metering valve in a second different operating condition.

Referring to FIGS. 1 to 3, a dual-fuel fuel delivery system for an automobile comprises an injection system 10 a first fuel reservoir 12 and a second fuel reservoir 14. For ease of reference, the first fuel reservoir 12 will be described as a petrol reservoir and the second fuel reservoir 14 will be described as a diesel fuel reservoir. However, this is not to be taken as limiting and in a dual-fuel fuel delivery system (or dual-fuel fuel injection system), the reservoirs may contain any two fuels suitable for the engine that the injection system is supplying. By way of example, the fuels may alternatively be diesel and ethanol; petrol and biodiesel; biodiesel and ethanol, or two different blends of biodiesel. Thus, in one suitable alternative to a dual-fuel system comprising petrol and diesel, the system operates using (bio)diesel and ethanol.

The dual-fuel fuel injection system 10 additionally comprises a fuel pump 16 and an inlet metering valve 18 upstream of the fuel pump. The fuel pump 16 pumps petrol from the petrol reservoir 12 to an accumulator volume in the form of a common rail 20 that, in the depicted embodiment, is connected to a set of four electronic fuel injectors 22. The pressure in the common rail 20 is monitored by a pressure sensor 24, which sends signals indicative of the fuel pressure in the common rail to an electronic controller (not shown). Unused petrol from the common rail 20 may be returned to the petrol reservoir 12 via a petrol return line 26 by operation of a pressure regulator 28 fitted in the petrol return line.

The dual-fuel fuel injection system 10 also comprises a second fuel pump 30, which pumps diesel from the diesel reservoir 14 to a second accumulator volume in the form of a common rail 32. In the depicted embodiment, diesel from the common rail 32 is supplied to a set of four electronic fuel injectors 34. Optionally the common rail 32 is provided with a pressure sensor 38 (indicated by dashed lines in FIGS. 1 to 3), which may, for example, be used for diagnostic purposes. In an advantageous embodiment, such a sensor is not required for the fuel delivery operation of the fuel injection system.

The dual-fuel fuel injection system 10 includes a fuel injection metering valve 40 for controlling the pressure of diesel in the common rail 32 such that it is driven to a value that is a predefined function of the petrol pressure in the common rail 20. In this embodiment, the metering valve 40 is arranged to control the pressures such that the diesel pressure is substantially the same as the petrol pressure (i.e. the metering valve is arranged to maintain substantially the same fuel pressure in the two sides of the injection system).

The metering valve 40 comprises a valve body 42 having a first inlet port indicated at 44 for receiving petrol from the petrol reservoir 12 and a second inlet port indicated at 46 for receiving diesel from the diesel reservoir 14. The valve body 42 contains valving depicted in the form of a floating spool 48 housed in a bore 50. Respective fuel inlet passages 52, 54 extend from the first inlet port 44 and second inlet port 46 to the bore 50. Respective fuel outlet passages 56, 58 extend from the bore 50 to a first outlet port indicated at 60 and a second outlet port indicated at 62. The petrol and diesel flows across the bore 50 from the fuel inlet passages 52, 54 to the fuel outlet passages 56, 58 are controlled according to the position of the spool 48 in the bore 50. The arrangement of the spool 48 and bore 50 in the fuel flow path between the inlet passages 52, 54 and the respective fuel outlet passages 56, 58 may thus be considered to comprise first and second metering ports for the first and second fuels respectively.

A take off line 64 from the petrol return line 26 feeds petrol into a first flow path 66 in the valve body 42. The first flow path 66 leads into a first chamber 68 defined at one end of the bore 50 between the bore wall and an end surface 70 of the spool 48. Optionally a fuel flow regulator, for example, in the form of a damping orifice 71 is placed in the take off line 64. A take off line 72 from the diesel return line 36 feeds diesel into a second flow path 74 in the valve body 42. The second flow path 74 leads into a second chamber 76 defined at the opposite end of the bore 50 between the bore wall and an end surface 78 of the spool 48.

In the embodiment shown, the respective surface areas of the end surfaces 70, 78 of the spool 48 are substantially equal so that the spool will act to try and equalise the fuel pressures in the common rails 20, 32.

FIG. 1 shows the position of the spool 48 when the fuel pressures in the common rails 20, 32 are matched. In this case, the pressures in the chambers 68, 76 will be approximately matched and because the respective surface areas of the end surfaces 70, 78 are substantially equal and the spool is otherwise free to move in the bore 50, there is no net force on the spool. Therefore, the spool 48 occupies a neutral position at which it allows fuel to flow evenly across the bore 50 from the inlet passages 52, 54, through the respective outlet passages 56, 58 to each of the fuel pumps 16, 30.

FIG. 2 shows the position of the spool 48 when the pressure in the second common rail 32 exceeds the pressure in the first common rail 20. This pressure imbalance could, for example, be caused by opening the pressure regulator 28 and/or restricting the inlet metering valve 18. In this case, the pressure in the second chamber 76 will be higher than the pressure in the first chamber 68 and so the spool will move axially in the bore 50 in the direction of the first chamber 68. This movement causes a land 80 of the spool 48 to restrict the flow of diesel from the fuel inlet passage 54 to the fuel outlet passage 58 and a land 82 to move to a position that opens up the flow path through the bore 50 between the fuel inlet passage 52 and the fuel outlet passage 56 so that the pressure in the common rail 20 is able to increase, while the pressure in the common rail 32 is held steady, or allowed to decay as a result of the injection of diesel from the fuel injectors 34.

It should be appreciated that while the embodiments described are shown to have a particular arrangement of the spool 48 and bore 50 to comprise the first and second metering ports, any other suitable system of providing a metering port responsive to movement of the spool 48 within bore 50 may be used. By way of example, the spool 48 may be provided with one or more radial through bores to define flow paths from respective inlet passages 52, 54 and outlet passages 56, 58.

FIG. 3 shows the position of the spool 48 when the pressure in the common rail 32 is lower than in the common rail 20. This pressure imbalance could, for example be caused by closing the pressure regulator 28 and/or opening the inlet metering valve 18. In this case, the pressure in the second chamber 76 will be lower than the pressure in the first chamber 68 and so the spool 48 will move axially in the bore 50 in the direction of the second chamber 76. This moves the land 82 to a position at which it restricts the flow of petrol from the fuel inlet passage 52 to the fuel outlet passage 56 and the land 80 to a position that opens up the flow path through the bore 50 between the fuel inlet passage 54 and fuel outlet passage 58, so that the second fuel pump 30 is able to pump more diesel and the pressure in the common rail 32 increases to that in the common rail 20.

It can thus be seen that the metering valve 40 controls the petrol and diesel pressures in two distinct injection sub-systems within the dual-fuel fuel injection system 10 such that the diesel pressure in the second system tracks the petrol pressure in the first system as the metering valve seeks to maintain a pressure balance between the two injection systems. Beneficially, this means that a single electronic controller (not shown) inlet metering valve 18 and pressure regulator 28 can be used to control the fuel pressure in the two systems, thus reducing the number of components needed to control the fuel pressures in a dual-fuel fuel injection system. In the embodiment shown in FIGS. 1 to 3, the pressure of the petrol in the common rail 20 is controlled by the inlet metering valve 18 and pressure regulator 28 under the control of an electronic controller (not shown) and the fuel injection metering valve 40 operates to cause the pressure of the diesel in the common rail 32 to follow the pressure of the petrol. In effect, the inlet metering valve 18 and pressure regulator 28 and associated electronic control unit (ECU) simultaneously control the injection pressure of the diesel and petrol in the respective common rails.

In the dual-fuel fuel injection system 10 illustrated, there are respective sets of fuel injectors 22, 34 for each of the two fuels. However, if the injectors 22 were designed so as to be able to selectively inject two different fuels, the set of injectors 34 could be dispensed with and the common rail 32 could be arranged to supply the set of injectors 22 (not shown), thereby further simplifying the dual-fuel fuel injection system 10. Hence, in such an embodiment there would be one set of fuel injectors 22 (or 34), and the common rail 20 and common rail 32 would both be fluidly connected to that set of injectors, for example, via fuel flow pipes.

It should also be appreciated that while the embodiments depicted have sets of injectors which each have four individual injectors, each "set" of injectors may comprise any desirable number of individual injectors, such as 2, 4, 6, 8, 12, 16 and so on.

The fuel injection metering valve 40 has been described as operating with two different fuels, with the metering valve controlling the pressure of the two fuels in the respective common rails 20, 32 such that the pressure of one fuel in its common rail tracks that of the other. However, while the metering valve is particularly applicable to allowing different fuels to be used in one fuel delivery system, it may also be used for controlling differentially the fuel pressure in each rail of a twin-rail system that uses just one fuel type. This would make it possible to use a common rail system that has capacity for a four or six cylinder engine on an eight of twelve cylinder engine by simply using a pair of the rails with the fuel pressure in the second rail being kept equal to the pressure in the first by operation of the metering valve 40. Typically, such an arrangement may be useful where it is more economical or efficient to use two smaller fuel pumps (or a dual-fuel pump) instead of one larger fuel pump. Such an arrangement is particularly beneficial where it is desirable to have a choice of rail pressures to inject from (even with just one fuel type), so that different injections in a firing cycle can be injected at different pressures in order to give an extra degree of freedom to optimise engine emissions. In this case, the metering valve may suitably be configured such that the pressure in the second common rail tracked that in the first, but such that there was a predetermined difference between the two output pressures.

Modifications to the fuel injection metering valve that would make it possible to achieve a differential fuel pressure in each of the common rails are described below. It will be understood that the fuel injection metering valves modified in this way could equally be used to pump different fuels in cases in which a predetermined pressure difference between the two fuels is required and for ease of description, the modified fuel injection metering valves will be described in use in the dual-fuel fuel injection system 10.

Modifications to the fuel injection metering valve 40 will now be described with reference to FIGS. 4 to 9. It should be appreciated that any of the different forms of modifications may be used either alone, or in pairs comprising the same type or different types of modification. In the description of the modifications, the reference numerals used in FIGS. 1 to 3 will be used to identify like parts so as to avoid repetition of description.

Figure 4:
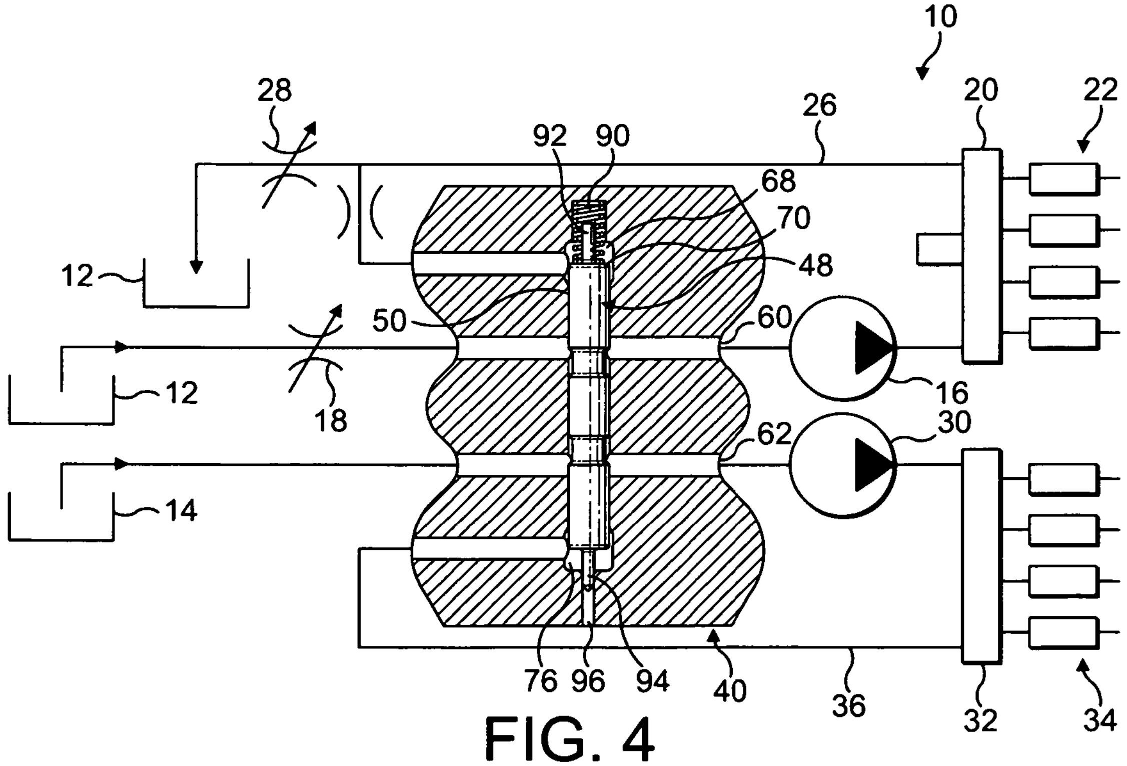
FIG. 4 shows the dual-fuel fuel injection valve of FIG. 1 with a modified fuel injection metering valve.

FIG. 4 shows two modifications to the metering valve 40. Otherwise all components of the fuel injection system are as shown in FIGS. 1 to 3.

The first modification shown in FIG. 4, is the inclusion of a biasing member suitably in the form of a coil spring 90 disposed in the chamber 68. In this embodiment, the spring 90 is located around a guidepost 92 that extends coaxially from the end surface 70 of the spool 48 and acts between the end surface 70 and the opposed end wall of the bore 50.

The second modification shown in FIG. 4 is the provision of a vent valve 94, 96 in the form of a needle 94 provided in a passage 96 extending from the chamber 76 and exposed to a relatively low pressure region of the fuel injection system 10. Conveniently, the low pressure region with which the passage 96 communicates is the fuel reservoir 14. Used by itself without including the spring 90, the vent valve 94, 96 opens when the fuel pressure in the chamber 76 exceeds the fuel pressure in the chamber 68 to allow the fuel pressure in the common rail 32 to collapse (quickly) in the same way as the pressure would collapse quickly in the common rail 20 if the pressure regulator 28 were opened.

Used by itself without the vent valve 94, 96, the effect of the spring 90 is to provide a difference in the fuel supply (or flow rate) between the respective outputs from the first and second outlet ports to the common rails 20, 32. The amount of the fuel supply difference is determined by the strength of the spring, since in order for the spool 48 to be moved from the neutral position indicated in FIG. 1, the fuel pressure in the chamber 76 will have to be greater than the fuel pressure in the chamber 68 by an amount sufficient to overcome the spring force. In an alternative embodiment, the biasing member may be arranged within the chamber 76, such that the spool 48 is generally biased towards the chamber 68. Although not shown, it will be appreciated that springs and guideposts could be provided at both ends of the spool to provide the same effect. In that case, in order to provide the desired difference between the fuel flow rates from the two outputs one spring would have to be stronger than the other. For example, it might be desirable to have springs at both ends of the spool 48 in order to make it respond more quickly to changes of the fuel pressure in the chambers 68, 76.

When the vent valve 94, 96 is used in combination with a biasing member such as the spring 90 as shown in FIG. 4, the vent valve will only open when the fuel pressure in the chamber 76 exceeds the fuel pressure in the chamber 68 by an amount determined by the spring rate (or force). The needle 94 is free to enter the passage 96, so allowing the spool 48 to provide the initial response to changes of pressure, such that most of the control can be performed by the more efficient metering provided by movement of the spool 48 in the bore 50 and the loss of high pressure fuel inherent in opening the vent valve 94, 96 is kept to a minimum.

Figure 5:
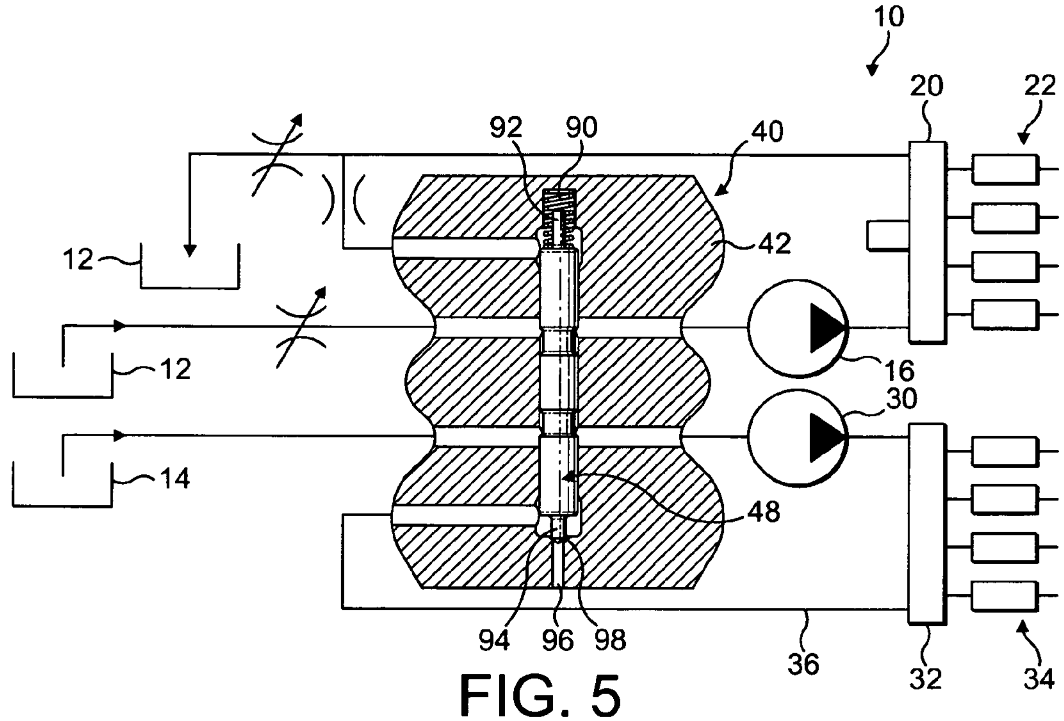
FIG. 5 shows the dual-fuel fuel injection valve of FIG. 1 with an alternative modified fuel injection metering valve.

FIG. 5 shows an alternative embodiment of the vent valve 94, 96 in which the spool 48 of the metering valve 40 is provided with a vent valve that is biased against a valve seat 98. Otherwise all components of the metering valve are as shown in FIG. 4.

The effect of having the vent valve 94, 96 biased against the valve seat 98 is that the metering valve 40 only comes into effect if the fuel pressure in the common rail 32 exceeds the fuel pressure in the common rail 20 by a predetermined threshold value. This mechanism may improve pressure stability in the common rail 20 at the expense of larger pressure errors in the common rail 32.

Figure 6:
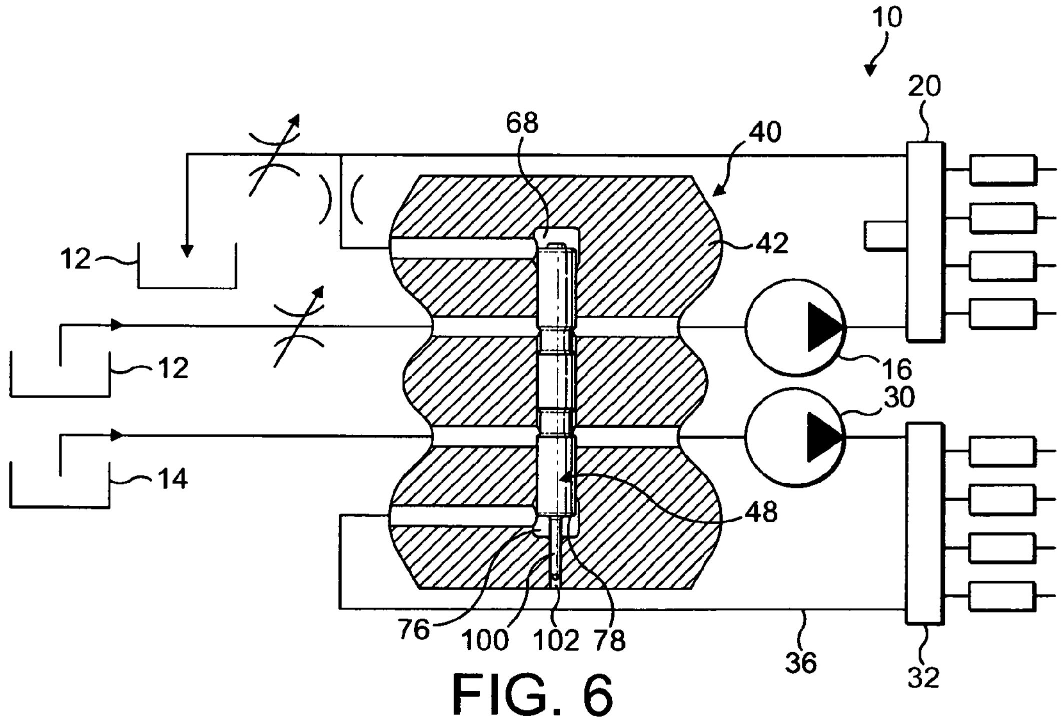
FIG. 6 shows the dual-fuel fuel injection valve of FIG. 1 with another alternative modified fuel injection metering valve.

FIG. 6 shows the spool 48 of the fuel injection metering valve 40 provided with a piston 100 that is housed in a cylindrical bore 102. Otherwise all components of the fuel injection system are as shown in FIGS. 1 to 3

The piston 100 extends coaxially from the end surface 78 of the spool 48 into the cylindrical bore 102, which leads from the chamber 76 to a relatively low-pressure area of the fuel injection system 10; for example, to the fuel reservoir 14. An effect of the piston 100 is to reduce the area of the end surface 70 that is exposed to the fuel pressure in the chamber 76 so that the fuel pressure in the common rail 32 will follow the fuel pressure in the common rail 20, but with a difference between the two that is defined by the diameter of the piston 100. It will be appreciated that the same effect can be obtained by providing different diameter pistons at the two ends of the spool 48, or making one land 80, 82 of the spool 48 and the respective mating portion of the bore 50 smaller in diameter than the other. In another embodiment, the piston 100 and cylindrical bore 102 may alternatively be provided at the opposite end of the spool 48, i.e. at the chamber 68 end of the spool.

Figure 7:
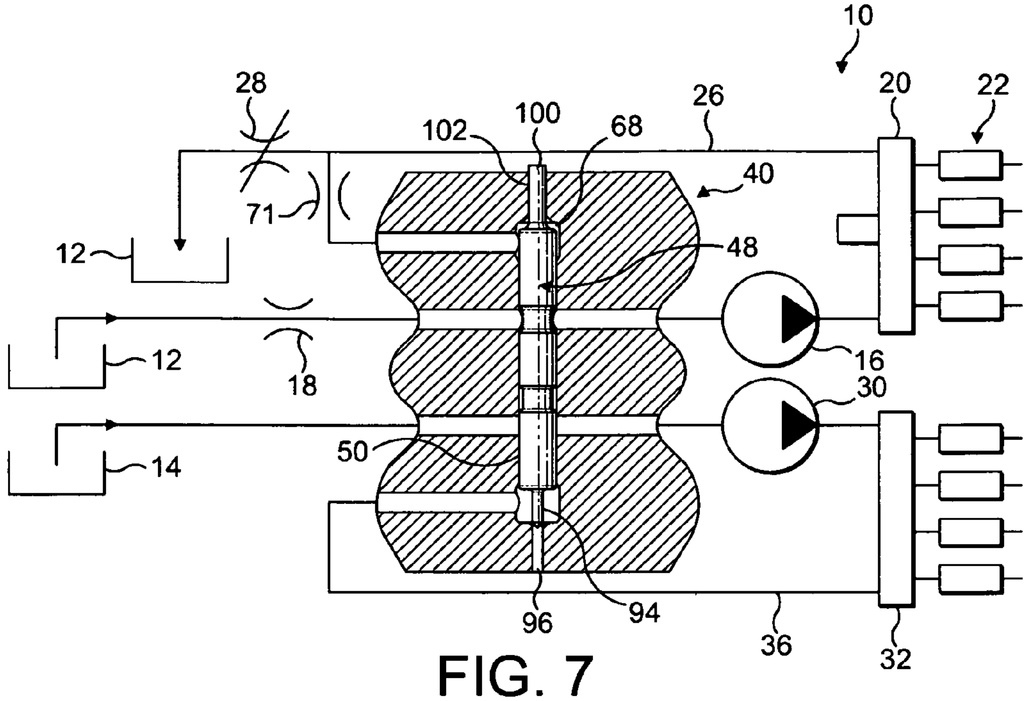
FIG. 7 shows the dual-fuel fuel injection valve of FIG. 1 with yet another alternative modified fuel injection metering valve.

FIG. 7 shows a modification to the metering valve 40 shown in FIG. 5. Otherwise all components of the fuel injection system are as shown in FIGS. 1 to 3 already described.

In this embodiment, the (spring) biasing arrangement (of FIG. 5) acting on the end of the spool 48 in the chamber 68 has been replaced by a piston arrangement 100, 102 essentially corresponding to that shown in FIG. 6. Advantageously, this provides the designer with the freedom to alter the pressure ratio between the common rail 20 and the common rail 32, by varying the diameter of the piston and/or the pressure to which the end face 110 of the piston 100 is exposed and the diameters of the needle 94 and passage 96, whilst retaining the function of the vent valve 94, 96.

A further modification would be to provide an actuator 112 (not shown) to act on the piston 100. Any suitable actuator may be used, such as a solenoid or a piezo-electric device. The provision of an actuator would allow for additional control functions under the control of an electronic controller (not shown).

Figure 8:
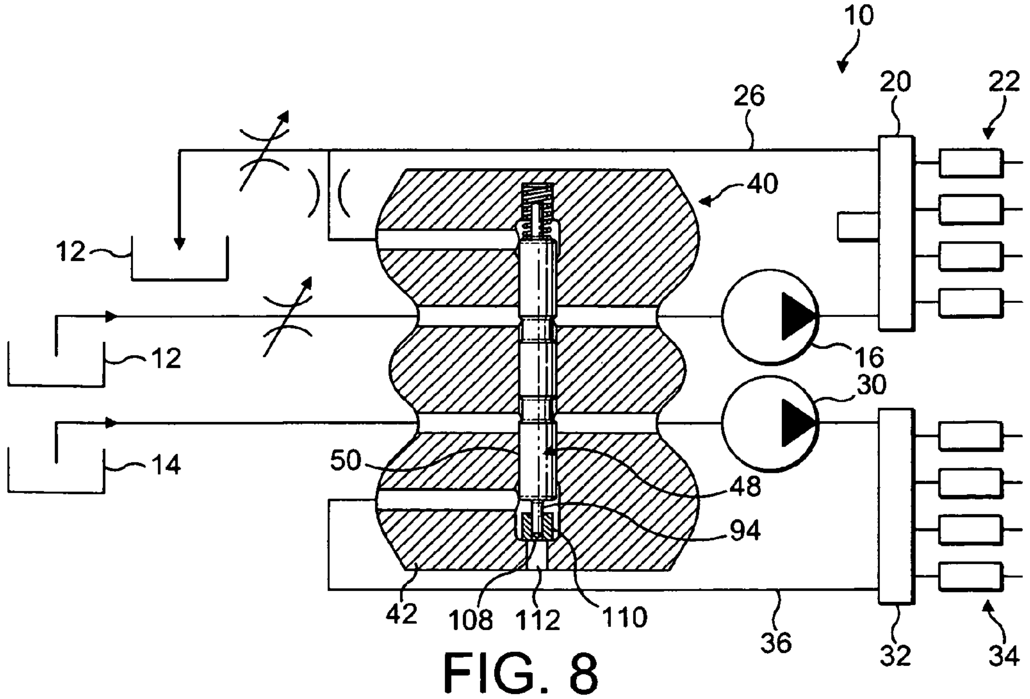
FIG. 8 shows the dual-fuel fuel injection valve of FIG. 1 with still another modified fuel injection metering valve.

FIG. 8 shows a modification to the metering valve 40 shown in FIG. 4. Otherwise all components of the fuel injection system are as shown in FIGS. 1 to 3.

To minimise high pressure leakage, it is important that the clearances between the moving components within the fuel injection metering valve 40 are as small as possible. In order to avoid having to provide the extra clearance that would be necessary to allow for eccentricities between the bore 50 and passage 96, in this embodiment the passage 96 is substituted by a passage 108 defined by a floating component in the form of a sleeve 110. The sleeve 110 is located in the chamber 76 and is free to move radially with respect to the spool axis so that it can align itself with the needle 94. Conveniently, an oversize bore 112 is provided in the body 42 to connect the passage 108 defined by the sleeve 110 with a low pressure region of the fuel injection system 10.

Although not shown, it will be appreciated that the floating component (e.g. sleeve 110) could be provided at one or both ends of the bore 50 of the metering valve 40. It will also be appreciated that a floating sleeve similar to the sleeve 110 could be used to define the vent valve seat 98 in FIG. 5.

Figure 9:
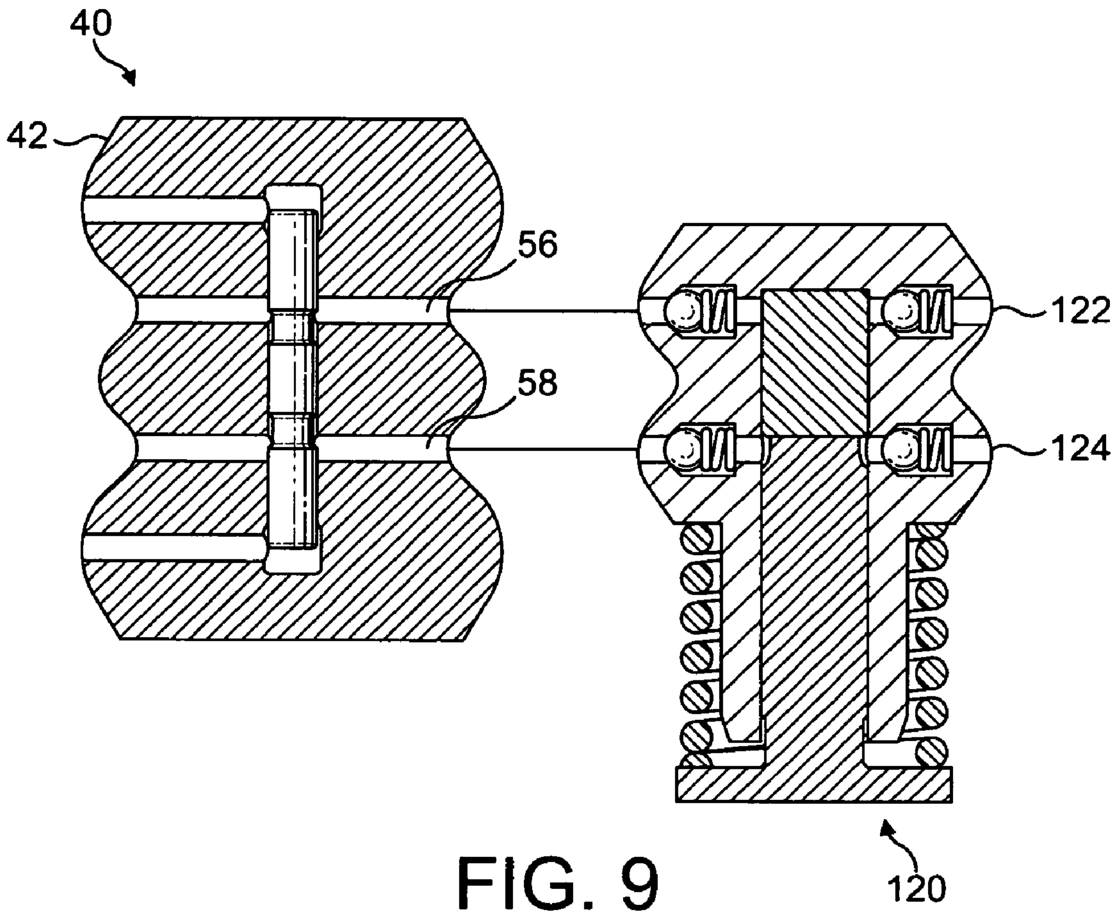
FIG. 9 is a schematic view of a fuel pump with an integral fuel injection metering valve.

FIG. 9 shows the fuel injection metering valve 40 incorporated in a single fuel pump 120. The pump receives the respective outputs from the fuel outlet passages 56, 58 of the valve body 42 and outputs respective fuel flows to the common rails (not shown) via respective outlets 122, 124. The fuel pump 120 can pump two different fuels or pump separate flows of the same fuel.

The provision of an integral pump and metering valve can provide advantages in terms of economy of space and weight and reduces the number of component to component connections to be made. It should be appreciated that as an alternative to integrating the metering valve 40 and pump 120, the pump 120 may simply be substituted for the fuel pumps 16, 30 in any of the illustrated fuel injection systems. Accordingly, the fuel delivery systems and fuel injection systems of the invention may comprise a fuel pump that is capable of pumping two different fuels, or pumping separate flows of the same fuel.

Although particular embodiments of the invention have been disclosed herein in detail, this has been done by way of example and for the purposes of illustration only. The aforementioned embodiments are not intended to be limiting with respect to the scope of the appended claims, which follow. For example: the arrangement of the metering ports; the number and choice of biasing arrangements; the type of fuel pump (e.g. single fuel flow or dual fuel flow); and the number and arrangement of fuel injectors may be decided on a case by case basis, and such variations are encompassed within the scope of the invention. In the methods of the invention, any single fuel or selection of two different fuels may be used. Thus, it is contemplated that various substitutions, alterations, and modifications may be made to the various components of the fuel delivery systems, fuel injection systems and metering valves, without departing from the spirit and scope of the invention as defined by the claims.

The invention claimed is:

1. A fuel injection metering valve comprising:

a first fuel outlet for supplying fuel to a first accumulator volume, a second fuel outlet for supplying fuel to a second accumulator volume, valving for controlling fuel flow to said first and second fuel outlets, a first flow path for exposing said valving to a fuel pressure representative of fuel pressure in said first accumulator volume and a second flow path for exposing said valving to fuel pressure representative of fuel pressure in said second accumulator volume, said valving being responsive to said representative fuel pressures to control the fuel supply from said second fuel outlet to said second accumulator volume as a function of the fuel pressure in said first accumulator volume.

2. A fuel injection metering valve as claimed in claim 1, further comprising at least one biasing element acting on said valving such that, in use, there is a fuel pressure difference between said first accumulator volume and said second accumulator volume that is at least in part determined by said at least one biasing element.

3. A fuel injection metering valve as claimed in claim 1, wherein said valving comprises a valve member that is axially slideable in respective opposed directions in response to said representative fuel pressures, said valve member being provided with a projection that is slideably received in a passage defined by a member that is able to move radially with respect to the valve member axis.

4. A fuel injection metering valve as claimed in claim 1, wherein said valving comprises respective pressure receiving portions exposed to said first and second representative fuel pressures, and is provided with at least one projection that is exposed to a different pressure for at least in part determining a pressure difference between said first accumulator volume and said second accumulator volume.

5. A fuel injection metering valve as claimed in claim 1, wherein said valving is provided with a projection that is axially slideable in a passage and arranged to vent one of said first flow path and said second flow path via said passage.

6. A fuel injection metering valve as claimed in claim 5, wherein the projection is biased into engagement with a valve seat.

7. A fuel injection metering valve as claimed in claim 1, wherein said valving comprises respective pressure receiving portions exposed to said first and second representative fuel pressures and arranged such that the fuel pressure in said second accumulator volume is controlled to be substantially equal to the fuel pressure in said first accumulator volume.

8. A fuel injection metering valve as claimed in claim 1, wherein, to reduce the pressure in one of said first or second accumulator volumes, the metering valve acts to decrease the fuel supply from said first or second fuel outlets, respectively; and wherein, to increase the pressure in one of said first or second accumulator volumes, the metering valve acts to increase the fuel supply from said first or second fuel outlets, respectively.

9. A fuel injection metering valve as claimed in claim 1, wherein the first and second accumulator volumes are first and second common rails.

10. A fuel pump having an integral fuel injection metering valve as claimed in claim 1, said pump comprising pumping apparatus for separately pumping and outputting respective fuel flows received from said first and second fuel outlets.

11. A fuel injection system comprising a fuel injection metering valve configured, in use, to supply a first fuel output and a second fuel output to a first accumulator volume and a second accumulator volume, respectively; and having valving in flow communication with respective flow paths that, in use, expose respective pressure receiving portions of the valving to respective fuel pressure flows indicative of the fuel pressures in said first and second accumulator volumes; said valving being responsive to said pressure flows to cause the fuel pressure in said second accumulator volume to follow the fuel pressure in the first accumulator volume.

12. A fuel injection system as claimed in claim 11, wherein said valving is associated with at least one device that causes the fuel pressure in said second accumulator volume to be different to the fuel pressure in said first accumulator volume by a predetermined amount.

13. A fuel injection system as claimed in claim 12, wherein said at least one device comprises at least one of a biasing member acting on said valving, and a member connected to said valving and exposed to a relatively low pressure for modifying the effect of the exposure of said valving to at least one of said pressure flows indicative of the fuel pressure in said first and second accumulator volumes.

14. A fuel injection system as claimed in claim 12, wherein said at least one device comprises a member connected to the valving and exposed to a relatively low pressure, said member projecting from said valving into a passage of a passage defining member and being axially slideable in said passage, said passage defining member being free to move radially with respect to the axis of sliding.

15. A fuel injection system as claimed in claim 11, comprising a venting device for venting pressure from the flow path that exposes the valving to the pressure flow indicative of the fuel pressure in said second accumulator volume.

16. A fuel injection system as claimed in claim 11, comprising at least one valve disposed upstream or downstream of said fuel injection metering valve and operable to receive commands for adjusting the fuel pressure in said flow path.

17. A fuel injection system as claimed in claim 11, comprising a fuel pump for receiving said first and second fuel outputs and selectively pumping said outputs to the respective first and second accumulator volumes.

18. A fuel injection system as claimed in claim 11, further comprising at least a first set of fuel injectors for receiving fuel from said first and said second accumulator volumes.

19. A fuel injection system as claimed in claim 18, which comprises a first set of fuel injectors for receiving fuel from said first accumulator volume and a second set of fuel injectors for receiving fuel from said second accumulator volume.

20. A fuel injection system as claimed in claim 11, wherein the first and second accumulator volumes are first and second common rails.

21. A fuel delivery system comprising a fuel injection system as claimed in claim 11 and respective fuel reservoirs connected with said fuel injection metering valve for supplying the fuels for said first and second fuel outputs.

22. A method of controlling fuel pressure in a fuel injection system, said method comprising:

pumping a first fuel from a fuel reservoir into a first accumulator volume, pumping a second fuel from a second fuel reservoir into a second accumulator volume, setting a delivery pressure for said first fuel from said first accumulator volume, exposing a valve member to a source of said first fuel that is at a pressure indicative of said delivery pressure and exposing said valve member to a source of said second fuel at a pressure indicative of a delivery pressure of said second fuel;

said valve member being operable to respond to the respective pressures indicative of delivery pressure to cause the delivery pressure of said second fuel to be substantially maintained in fixed relation to the delivery pressure of said first fuel.

23. A method as claimed in claim 22, wherein said valve member is movable in respective opposite directions by exposure to said first and second fuels from said respective sources.

24. A method as claimed in claim 22, wherein said first and second fuels are different fuels.

* * * * *